Patented Aug. 30, 1949

2,480,112

UNITED STATES PATENT OFFICE 2,480,112

AMINOBENZANTHRONE-THIOPHANTHRA-QUINONE ACRIDINES

Clarence F. Belcher, Bridgeton, N. J., and Lorraine A. Mero, Wilmington, Del., assignors to E. I. du Pont de Nemours & Company, Wilmington, Del., a corporation of Delaware No Drawing. Application November 15, 1947, Serial No. 786,338

3 Claims. (Cl. 260—274)

This invention relates to the preparation of new vat dyes of the anthraquinone series. The invention relates more particularly to the preparation of vat dyes which are alkali fusion products of benzathronyl-aminothiophanthraquinone compounds which carry in the 6-position of the benzathrone group an anthraquinonyl or a thiophanthraquinonyl radical.

As in the case of the alkali fusion of the benzanthronyl-aminothraquinones where it has never been proved with absolute certainty that the ring closure takes place only to form the acridine ring, so also in the ring closure of the compounds of the present invention, while the chemical constitution has not been proved beyond question, these compounds are generally considered as having, and will be represented by, the following structural formula, which is analogous to the formula generally accepted in the alkali fusion of the benzanthronyl-aminoanthraquinones:

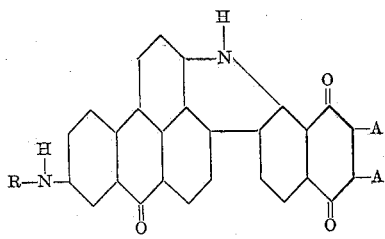

in which AA is a thiophene ring of the formula:

and R stands for a radical of the group consisting of anthraquinonyl and thiophanthraquinonyl radicals, the anthraquinonyl radicals being attached to the NH group in an alpha position and the thiophanthraquinonyl radical being attached to the NH group in one of the positions 5 and 8.

These dyes are considered to be benzanthronyl-aminothiophanthraquinone acridines and correspond to the benzanthronyl-aminoanthraquinone acridines of literature except that they carry in the vattable nucleus a thiophene ring. As illustrated in the above formula, it is generally considered that the group attached to the 6-position on the benzanthrone nucleus is not ring closed during the alkali fusion. These dyes dissolve in concentrated sulfuric acid to give green solutions, and dye cellulose fibers from an alkaline hydrosulfite or sodium sulfide vat in gray to olive-gray shades of exceedingly good fastness properties.

It is therefore an object of this invention to produce new vat dyes of the benzanthronyl-aminothiophanthraquinone acridine type which are outstanding in fastness properties and depth of shade and which will dye cellulosic fibers either from an alkali hydrosulfite vat or from sodium sulfide vats similar to that in dyeing with sulfur dyes.

The dyestuffs of this invention are prepared by alkali fusion of the benzanthronyl-aminothiophanthraquinone compounds by treatment with alkaline condensing agents, generally using an alcoholic medium. Fusion may be carried out under a wide variety of reaction conditions as to temperature and time, depending upon the reactants employed. A temperature range of 145° to 170° C. in general gives most satisfactory results, although temperatures outside of this range are occasionally necessary. The time of reaction depends upon the temperature chosen and the reactants used.

The benzanthronyl - aminophanthraquinones, which may be fused with caustic alkalies to produce the acridine derivatives of this invention, are those more particularly disclosed and claimed in our co-pending application Serial No. 786,339, now Patent 2,480,111, filed concurrently herewith and which have the general formula:

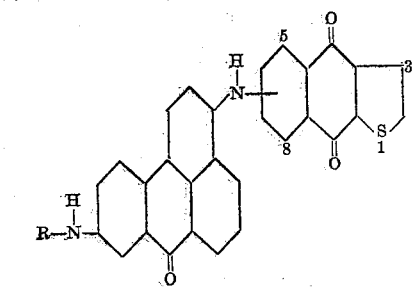

wherein the thiophanthraquinonyl radical is attached to the —N— in the 5- or 8-position and R stands for a radical of the group consisting of anthraquinonyl and thiophanthraquinonyl radicals, the anthraquinonyl radicals being attached to the NH group in an alpha position and the thiophanthraquinonyl radicals being attached to the NH group in one of the positions 5 and 8. These compounds may be prepared by condensing one mol of alpha-aminothiophanthraquinone with 6,Bz-1-dihalogenbenzanthrone (preferably the dibromobenzanthrone) and condensing the resulting product with alpha-aminoanthraquinone or by condensing one mol of the 6,Bz-1-dihalogenbenzanthrone with two mols of the 5- or 8-aminothiophanthraquinone. The condensation of the halogen-benzanthrones and the aminoanthraquinone or the aminothiophanthraquinone are carried out by the methods ordinarily used in condensing aminoanthraquinones with halogen-anthraquinones or halogen-benzanthrones.

The following examples are given to illustrate the preparation of these new dyes. The parts used are by weight, unless otherwise specified.

*Example 1*

To a melt prepared by adding 80 parts of sodium hydroxide gradually to 34 parts of water while slowly heating to 150° C., 20 parts of 6-[1-anthraquinonylamino]-Bz-1-(5-thiophanthraquinonylamino)-benzanthrone are added at 150° C. When the mixture is smooth, 16 parts of beta-methoxymethoxyethanol are added dropwise at 150°–155° C. The charge is stirred one hour at 155°–160° C., diluted with water and drowned in cold water. The product is slurried several hours at room temperature, filtered, washed alkali-free with water and dried. The acridine of 6-[1-anthraquinonylamino]-Bz-1-(5 - thiophanthraquinonylamino) - benzanthrone, which may be represented by the formula:

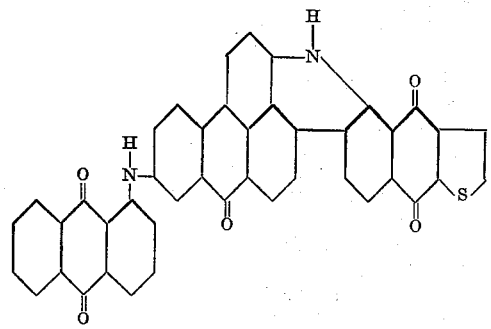

gives a green solution in concentrated sulfuric acid and dyes vegetable fibers in olive-gray shades of outstanding light fastness from a green alkaline hydrosulfite vat.

*Example 2*

To a melt prepared by adding 80 parts of sodium hydroxide gradually to 34 parts of water while heating to 150° C., 20 parts of 6,Bz-1-di-[5 - thiophanthraquinonylamino] - benzanthrone are added at 150° C. When the mixture is smooth, 16 parts of beta-methoxymethoxyethanol are added dropwise at 150°–155° C. The charge is stirred one hour at 155°–160° C., diluted with water and drowned in 1300 parts of cold water. The product is slurried several hours at room temperature, filtered, washed alkali-free with water and dried. The acridine of 6,Bz-1-di-[5 - thiophanthraquinonylamino]- benzanthrone, which may be represented by the formula:

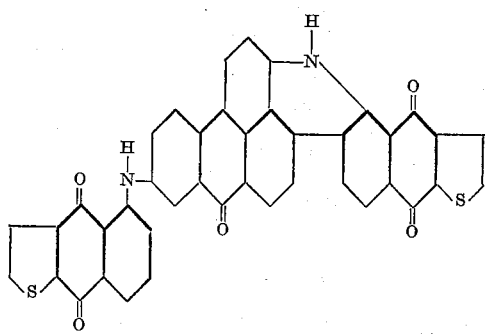

dissolves in concentrated sulfuric acid to give a green solution and dyes vegetable fibers in gray shades of exceptional light fastness from a green alkaline hydrosulfite vat.

*Example 3*

To a melt prepared by gradually adding 40 parts of sodium hydroxide to 17 parts of water while slowly heating to 150° C. are added 10 parts of 6-(1-anthraquinonylamino)-Bz-1-(8-thiophanthraquinonylamino)-benzanthrone at 150° C. After stirring at 150°–155° C. until the mixture is smooth, 8 parts of beta-methoxymethoxyethanol are added and the charge is then stirred at 155°–160° C. for one hour. The charge is diluted with water and then drowned in cold water. The product is slurried several hours at room temperature, filtered, washed alkali-free with water and dried. The acridine of 6-[anthraquinonylamino]-Bz-1-(8-thiophanthraquinonylamino)-benzanthrone, which may be represented by the formula:

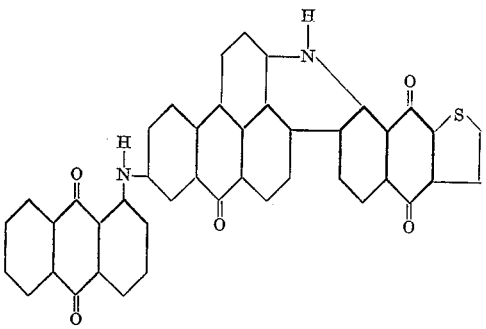

gives a greenish-colored solution in concentrated sulfuric acid and dyes vegetable fibers in gray shades of outstanding light fastness from a green alkaline-hydrosulfite vat.

Where in Example 2 two mols of 8-aminothiophanthraquinone are employed in place of the 5-aminothiophanthraquinone, a similar dye is obtained which dissolves in concentrated sulfuric acid with a green color and dyes cellulose fibers from a green alkaline hydrosulfite vat in gray shades of good fastness properties.

In a similar manner dyes corresponding to those of Example 2 may be prepared, using one mol of 5-aminothiophanthraquinone and one mol of 8-aminothiophanthraquinone where the condensation is carried out in two steps using either of the amino compounds first, or in one step using a mixture. So also in place of the 5-aminothiophanthraquinone of Example 1 or the 8-aminothiophanthraquinone of Example 3, a mixture of these two isomers may be employed.

Benzanthronyl-aminothiophanthraquinone acridines of this invention are new and valuable dyestuffs in that they all show a marked depth in shade and an unexpected increase in light fastness over their anthraquinone analogs. The exceptional light fastness is especially surprising since the benzanthronyl - aminoanthraquinone acridines are considered to show outstanding light fastness and a further improvement would not be expected, and certainly not in every case. It has also been found that these new colors are more easily vattable and that they are therefore excellent printing colors which build up to deeper shades than can normally be achieved with analogous anthraquinone colors.

Since these colors are readily vattable with sodium sulfide, they can be applied in the same manner as the sulfur colors and are therefore valuable additions in that particular field of vat dyes, giving colors of fastness properties not heretofore available in that class.

We claim:
1. The vat dyes obtained by the caustic alkali condensation of the benzanthronyl-aminothiophanthraquinones of the formula:

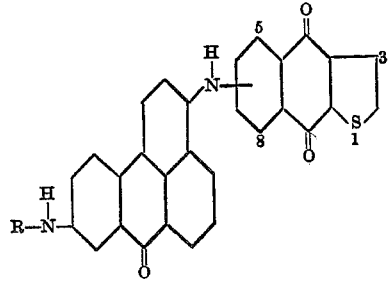

wherein the thiophanthraquinonyl radical is attached to the NH group in one of the positions 5 and 8, and R stands for a radical of the group consisting of anthraquinonyl and thiophanthraquinonyl radicals, the anthraquinonyl radical being attached to the NH group in an alpha position and the thiophanthraquinonyl radical being attached to the NH group in one of the positions 5 and 8.

2. The vat dye obtained by the caustic alkali condensation of the benzanthronyl-aminothiophanthraquinone of the formula:

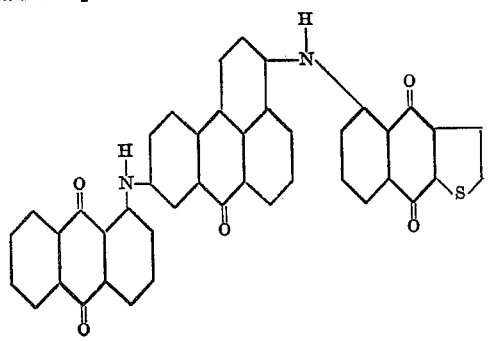

which condensation product gives a green solution in concentrated sulfuric acid and dyes vegetable fibers in olive-gray shades from an alkaline hydrosulfite vat.

3. The vat dye obtained by the caustic alkali condensation of the benzanthronyl-aminothiophanthraquinone of the formula:

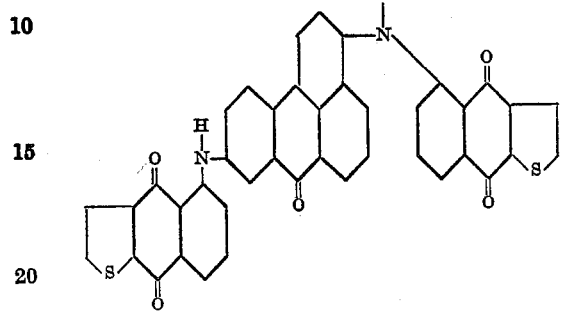

which dissolves in concentrated sulfuric acid with a green color and dyes vegetable fibers in gray shades from an alkaline hydrosulfite vat.

CLARENCE F. BELCHER.
LORRAINE A. MERO.

REFERENCES CITED

The following references are of record in the file of this patent:

UNITED STATES PATENTS

| Number | Name | Date |
| --- | --- | --- |
| 1,845,469 | Wolff et al. | Feb. 16, 1932 |
| 2,188,538 | Graham | Jan. 30, 1940 |

OTHER REFERENCES

Fieser et al.: "Organic Chemistry" (D. C. Heath; Boston; 1944), p. 527.